Sept. 29, 1953  S. A. PLATT  2,653,630
APPARATUS FOR FORMING WIRE COILS
Filed Feb. 28, 1950  15 Sheets-Sheet 1
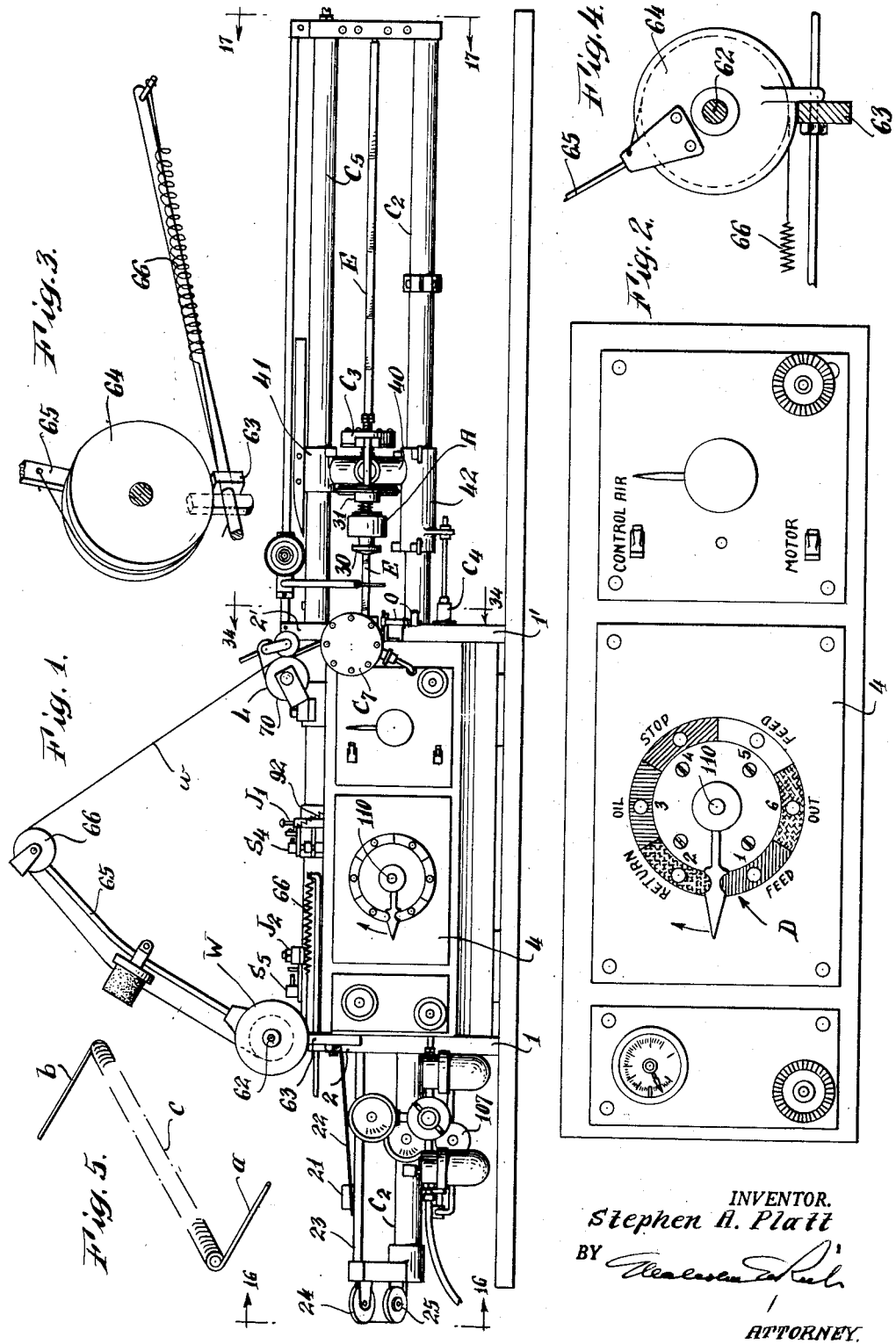
INVENTOR.
Stephen A. Platt
BY
ATTORNEY.

Sept. 29, 1953 S. A. PLATT 2,653,630
APPARATUS FOR FORMING WIRE COILS
Filed Feb. 28, 1950 15 Sheets-Sheet 2
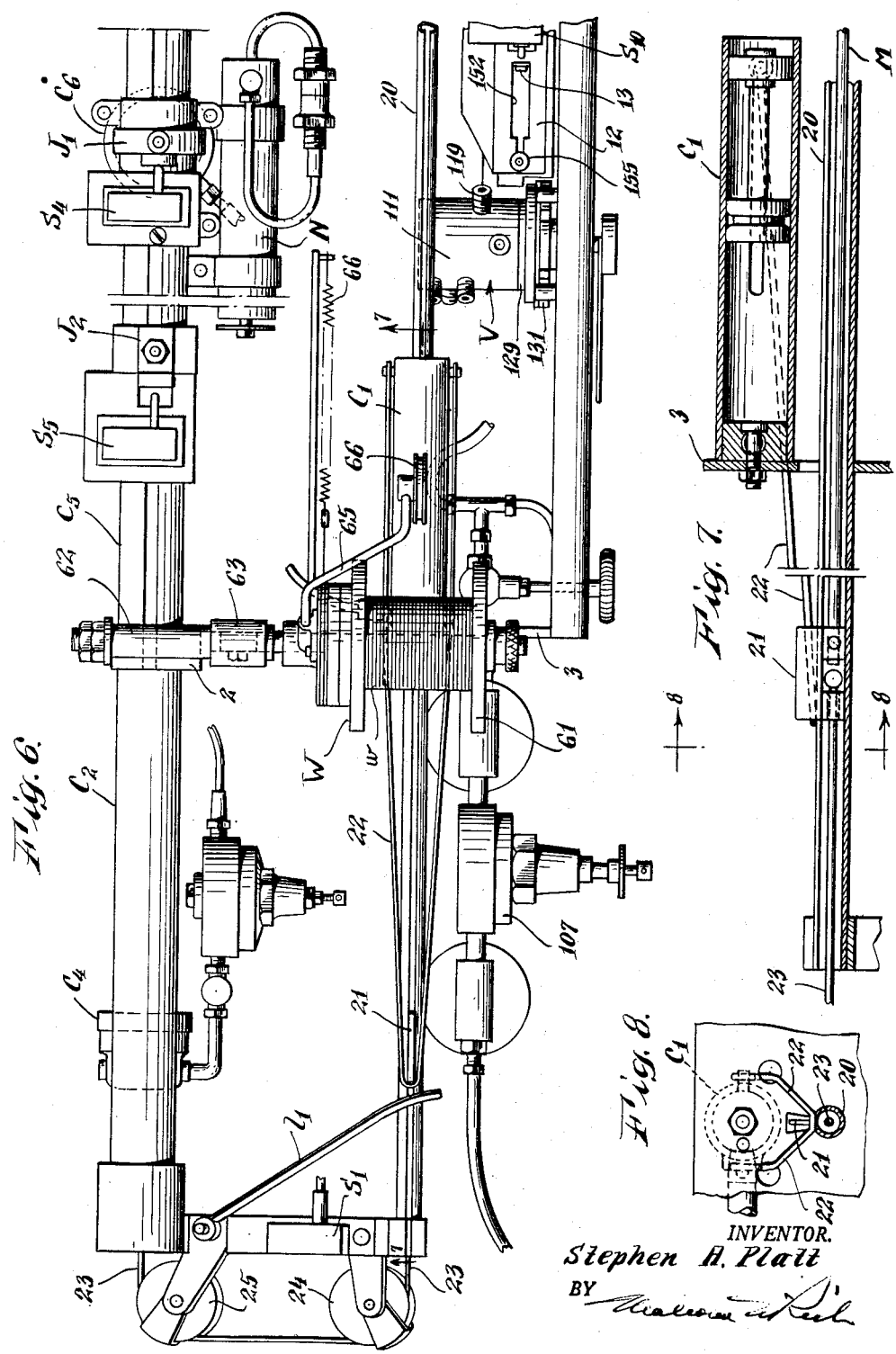
INVENTOR.
Stephen A. Platt
BY
ATTORNEY.

Sept. 29, 1953
S. A. PLATT
2,653,630
APPARATUS FOR FORMING WIRE COILS
Filed Feb. 28, 1950
15 Sheets-Sheet 3
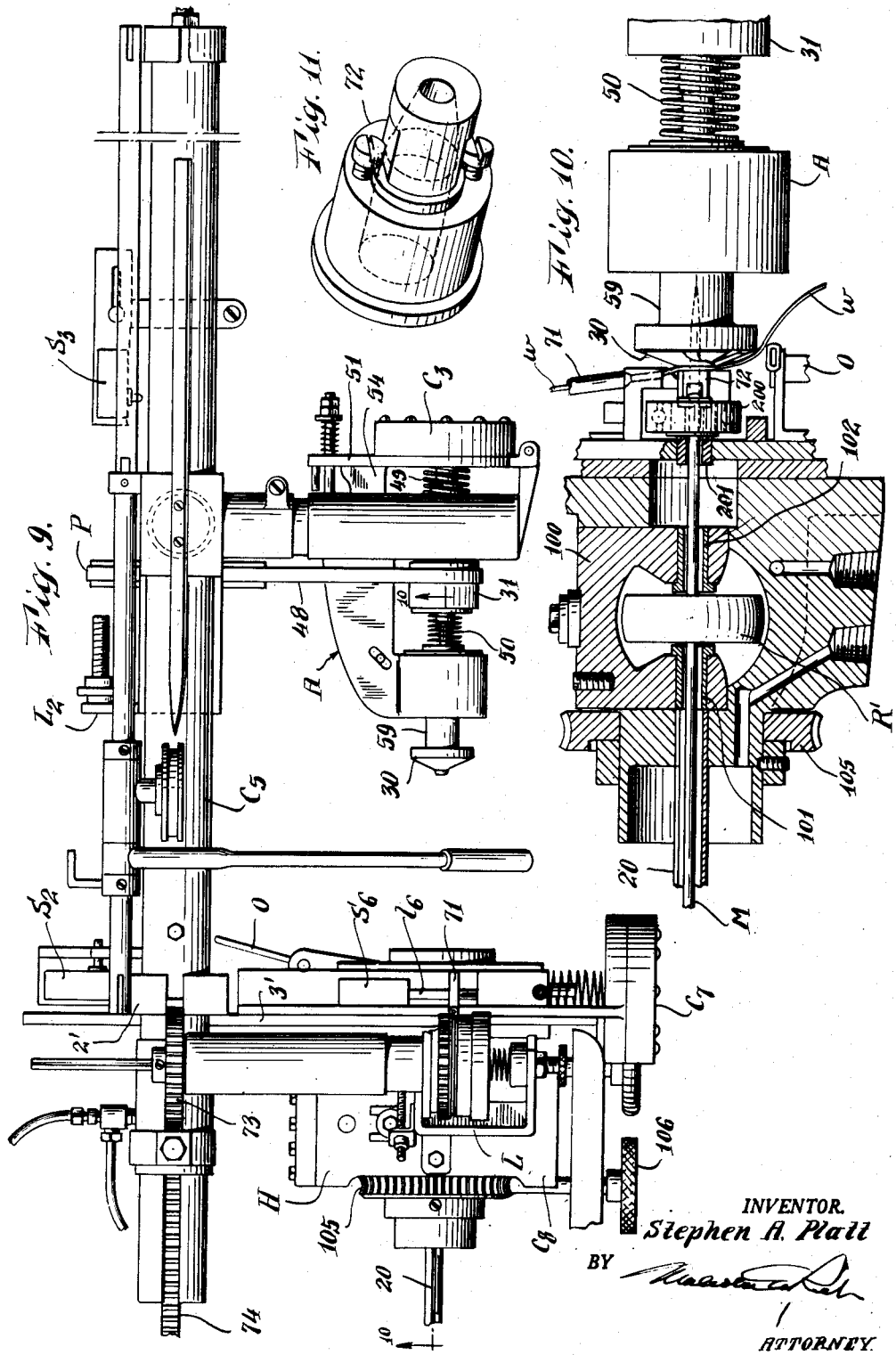
INVENTOR.
Stephen A. Platt
BY
ATTORNEY.

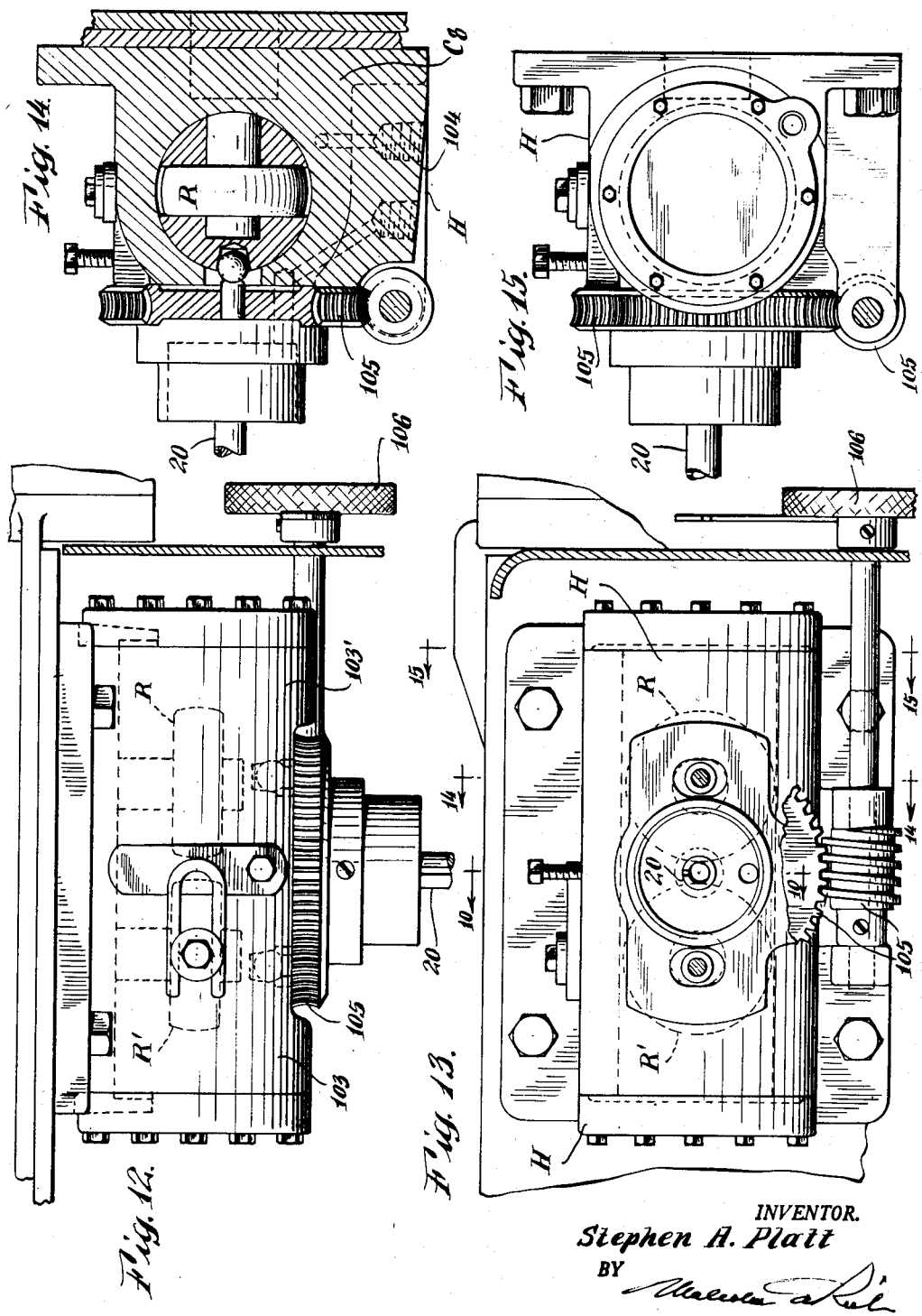

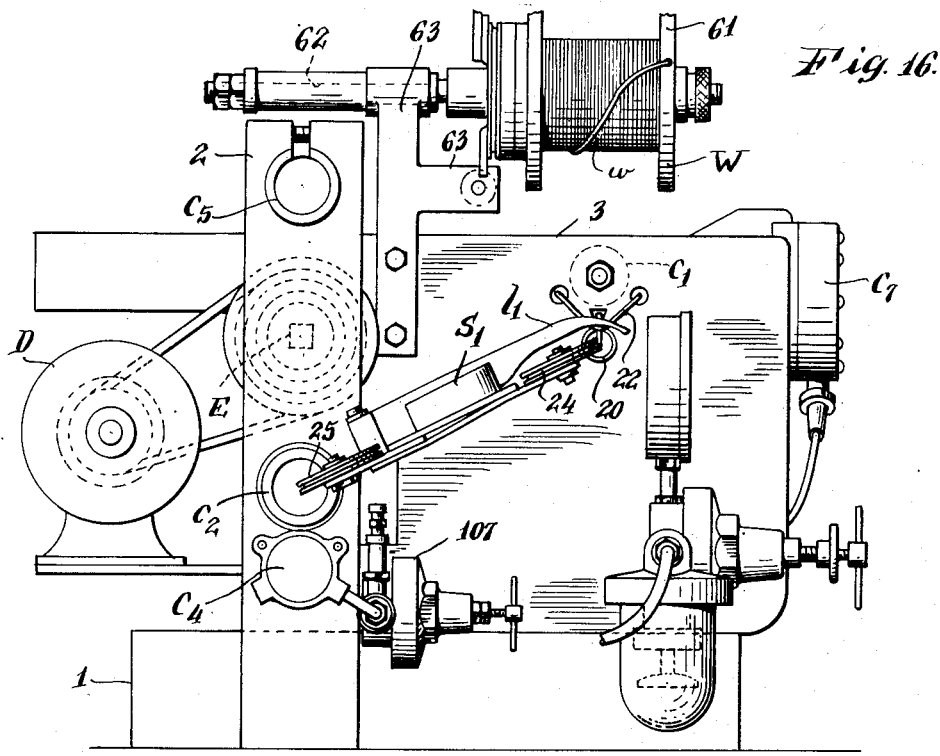
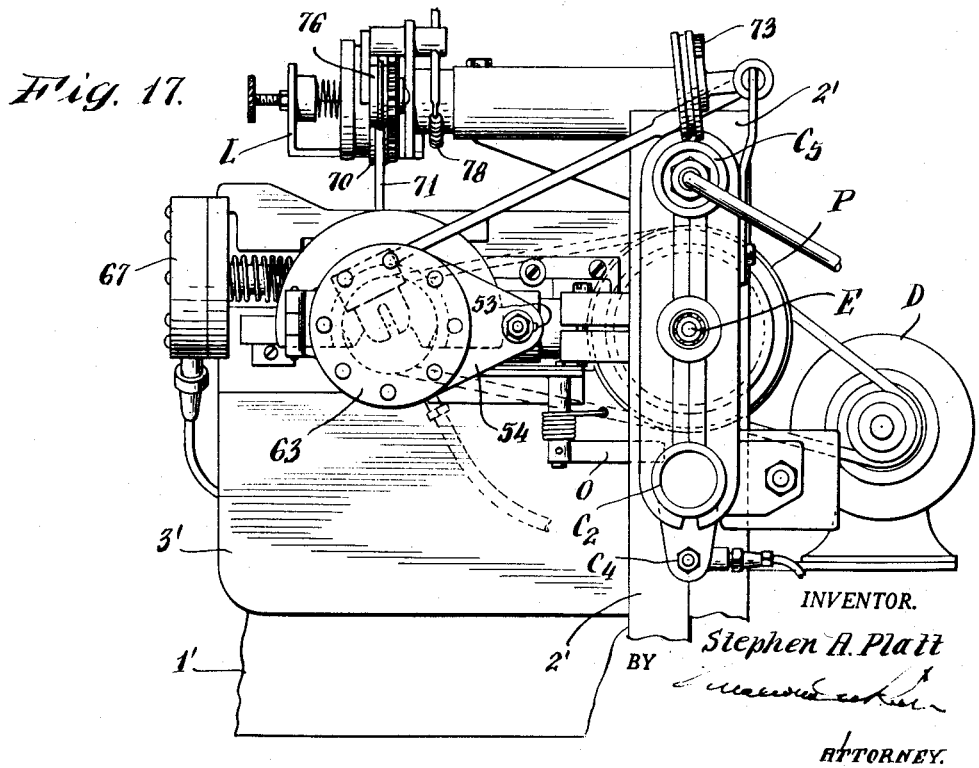

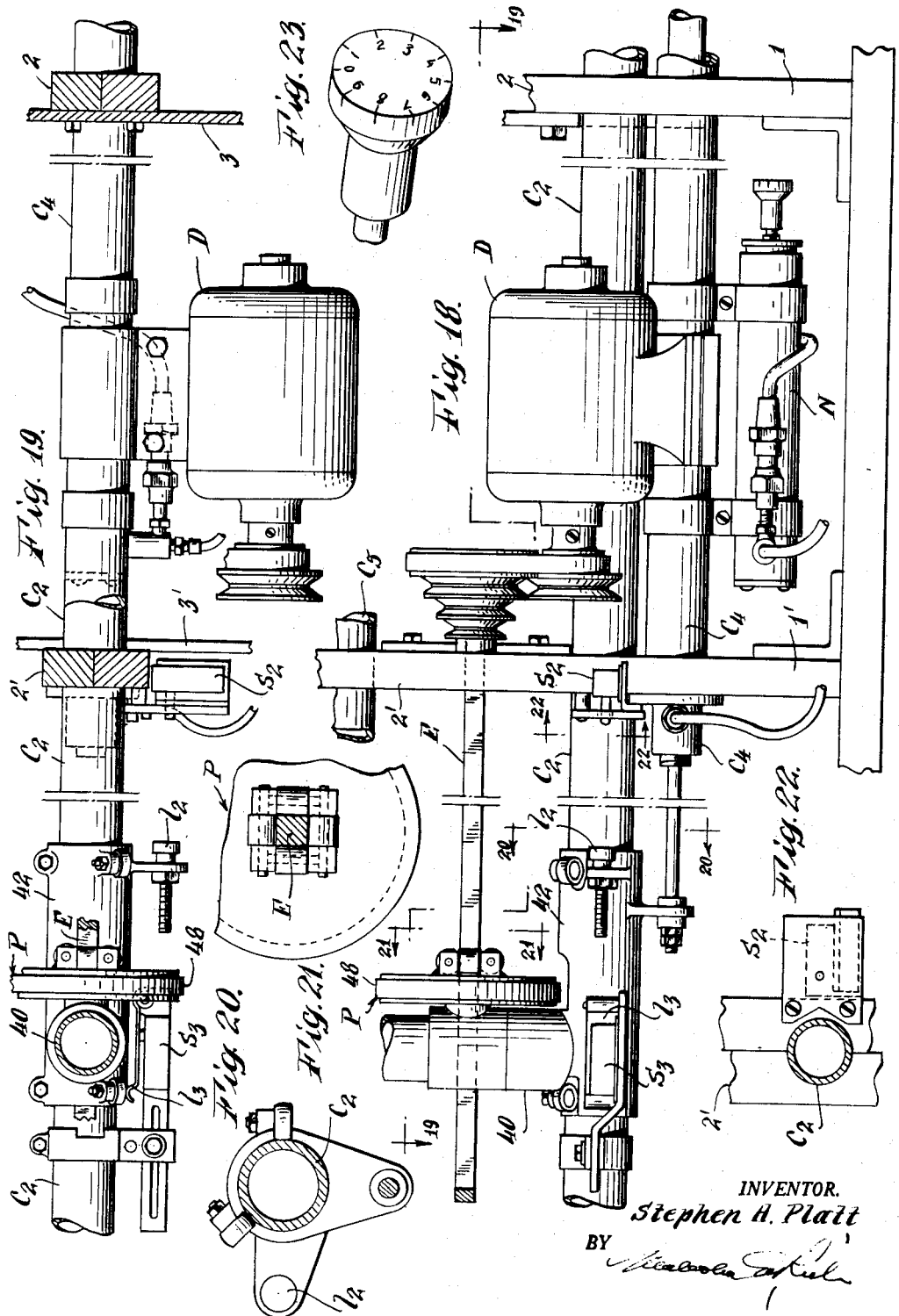

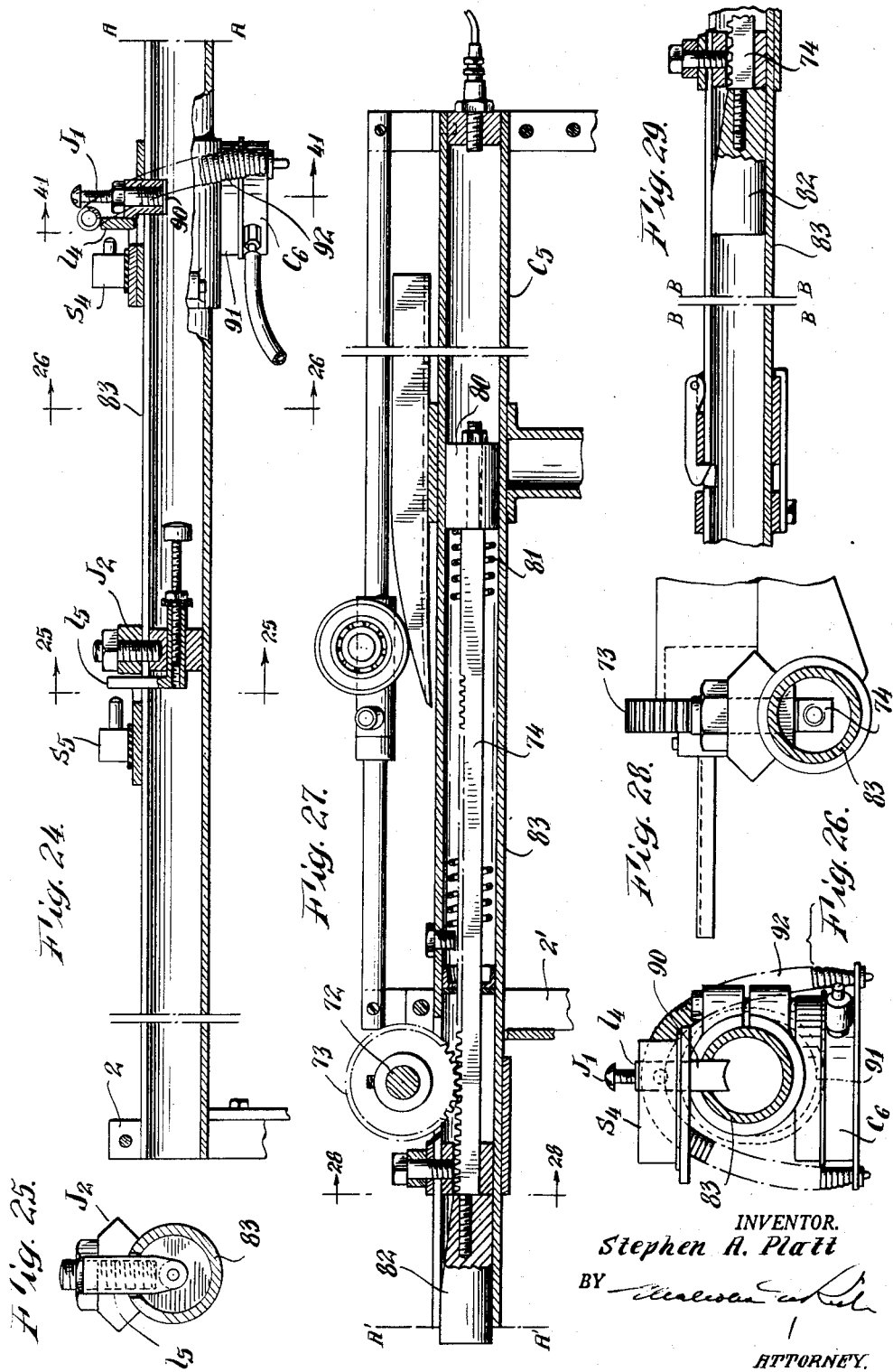

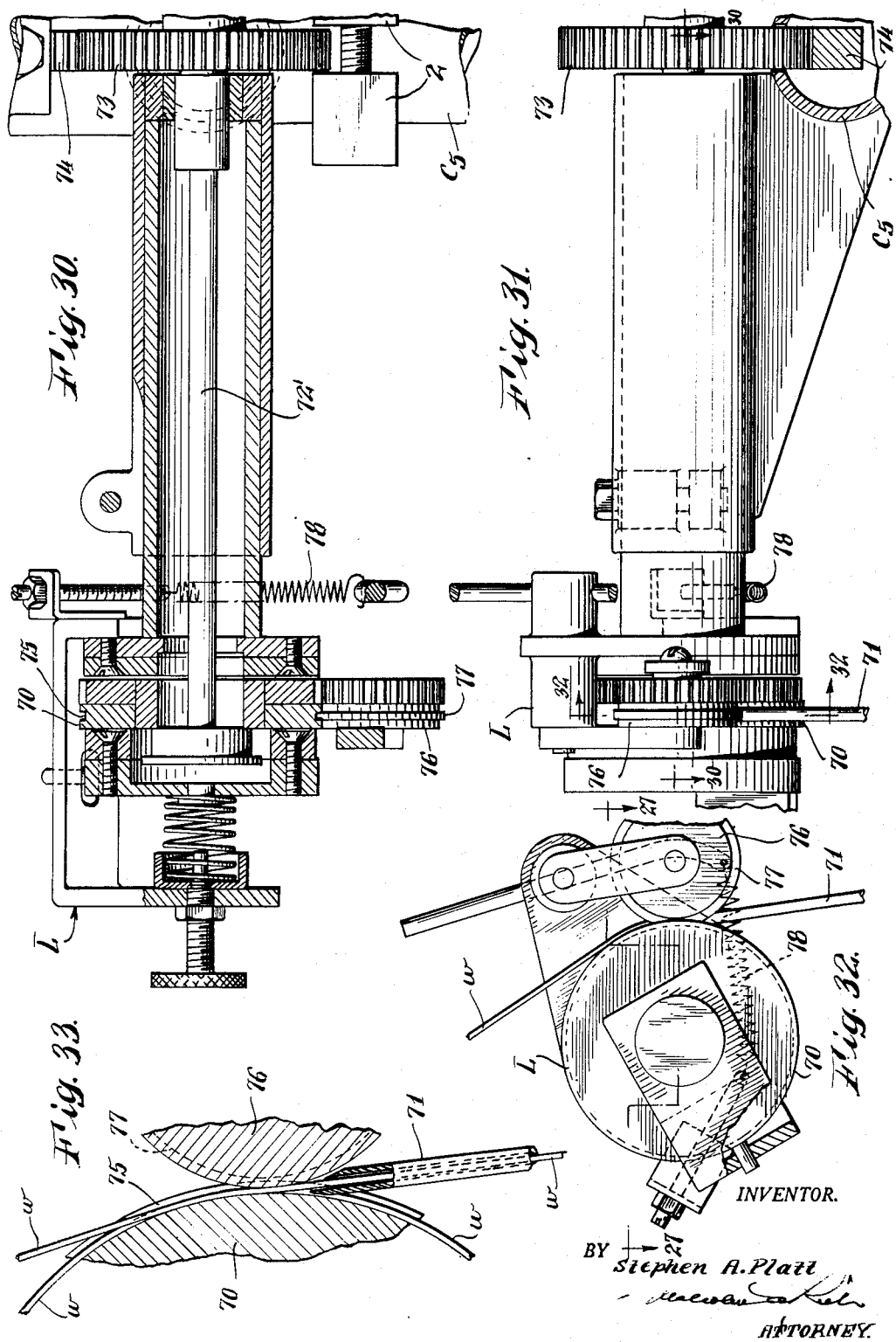

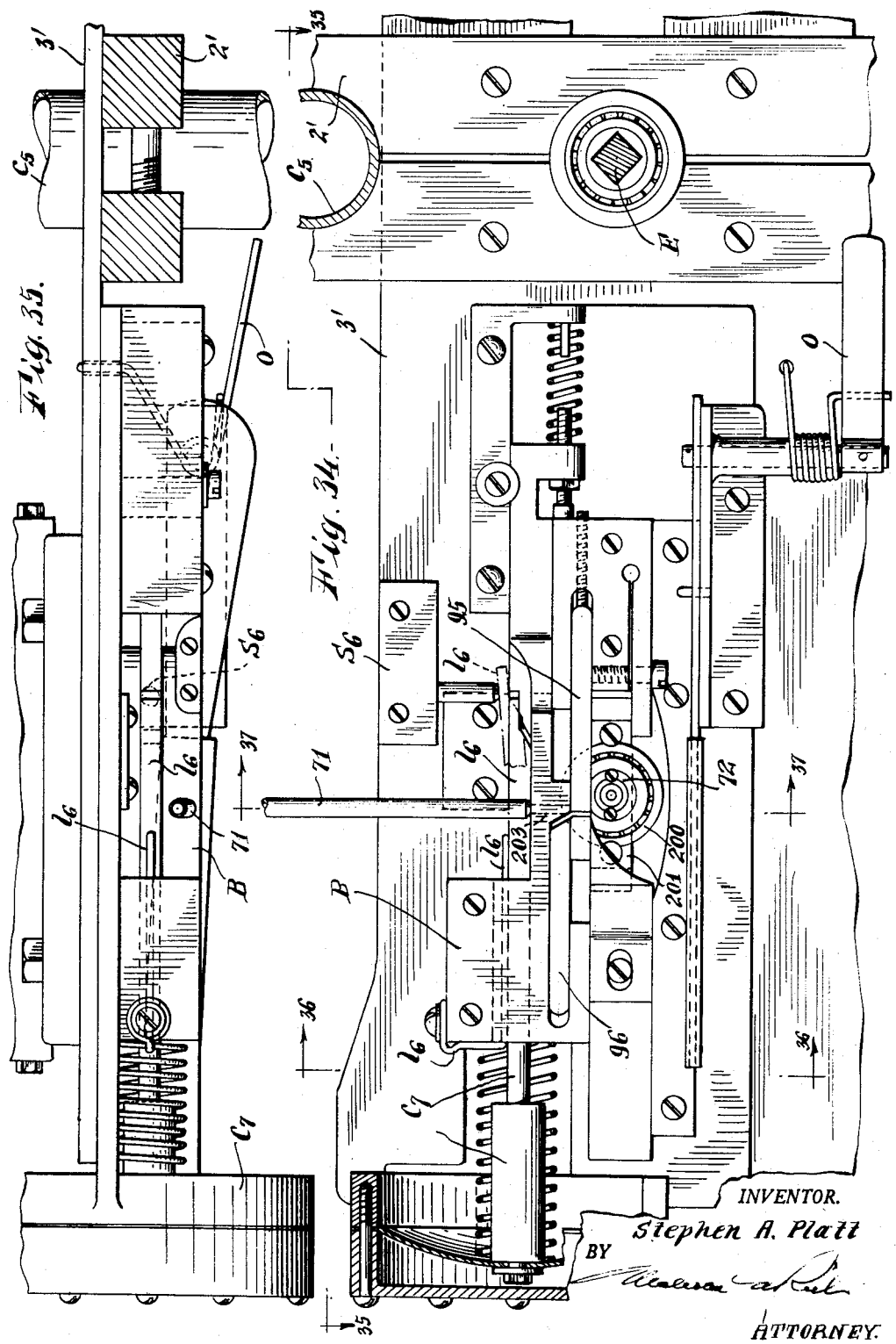

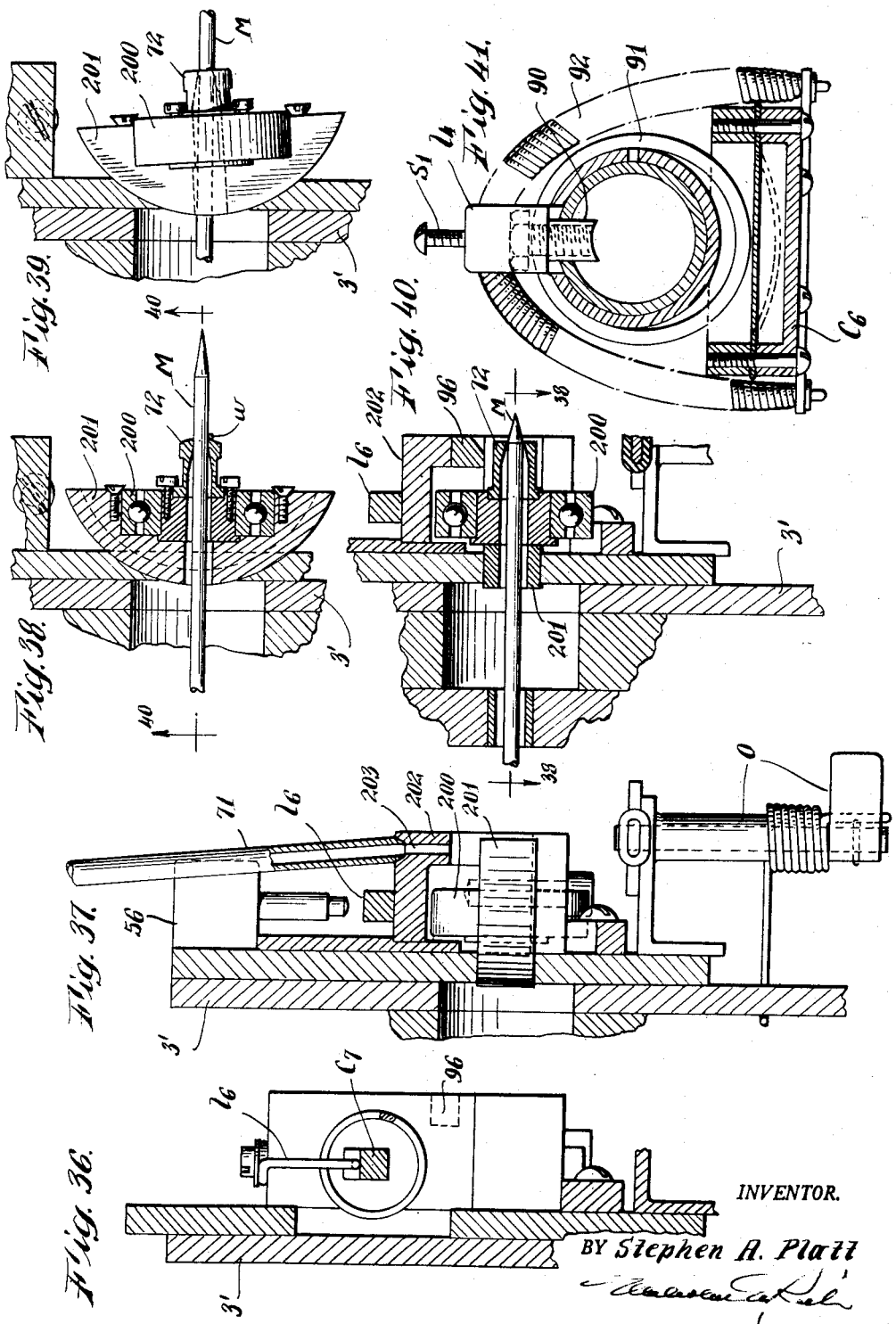

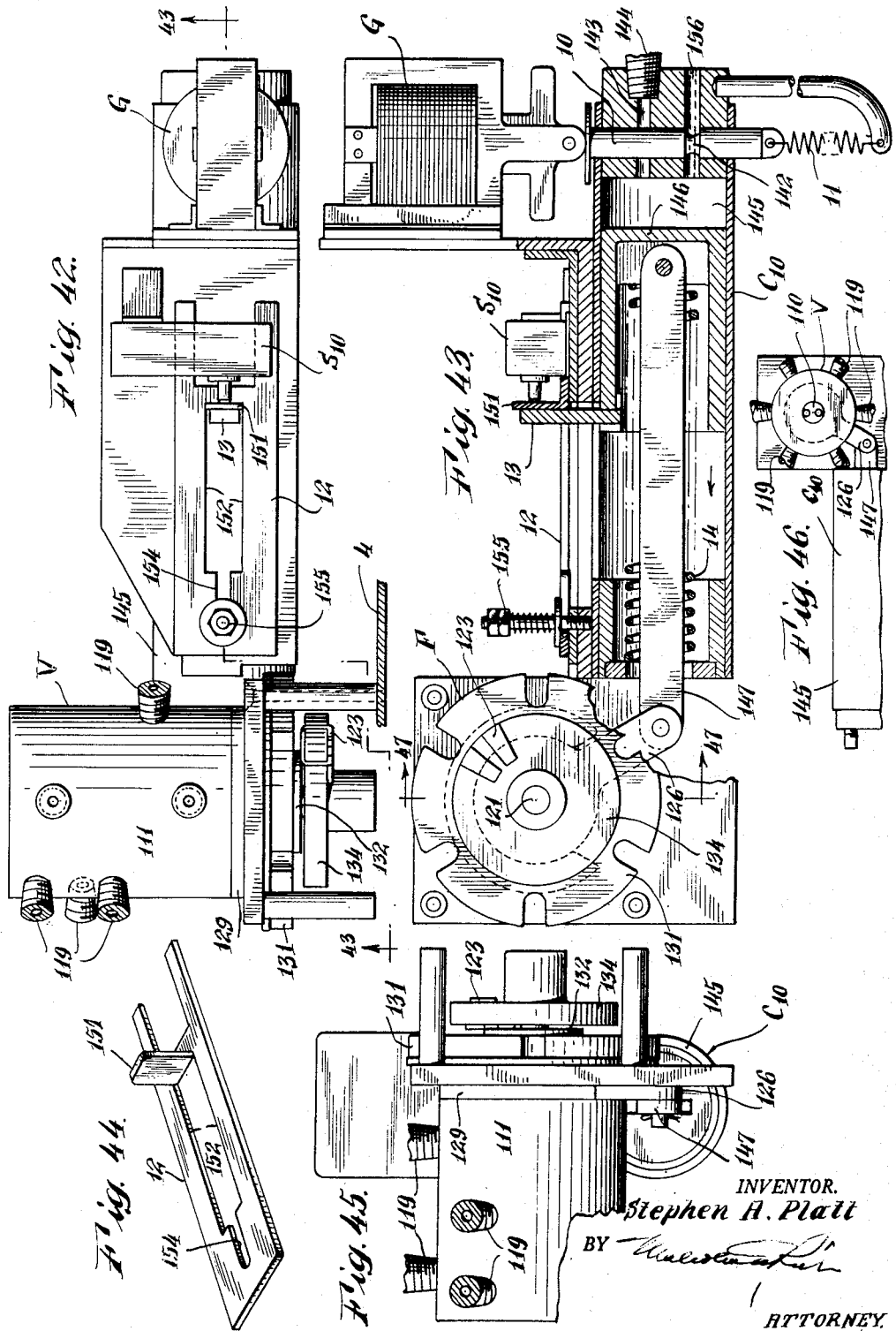

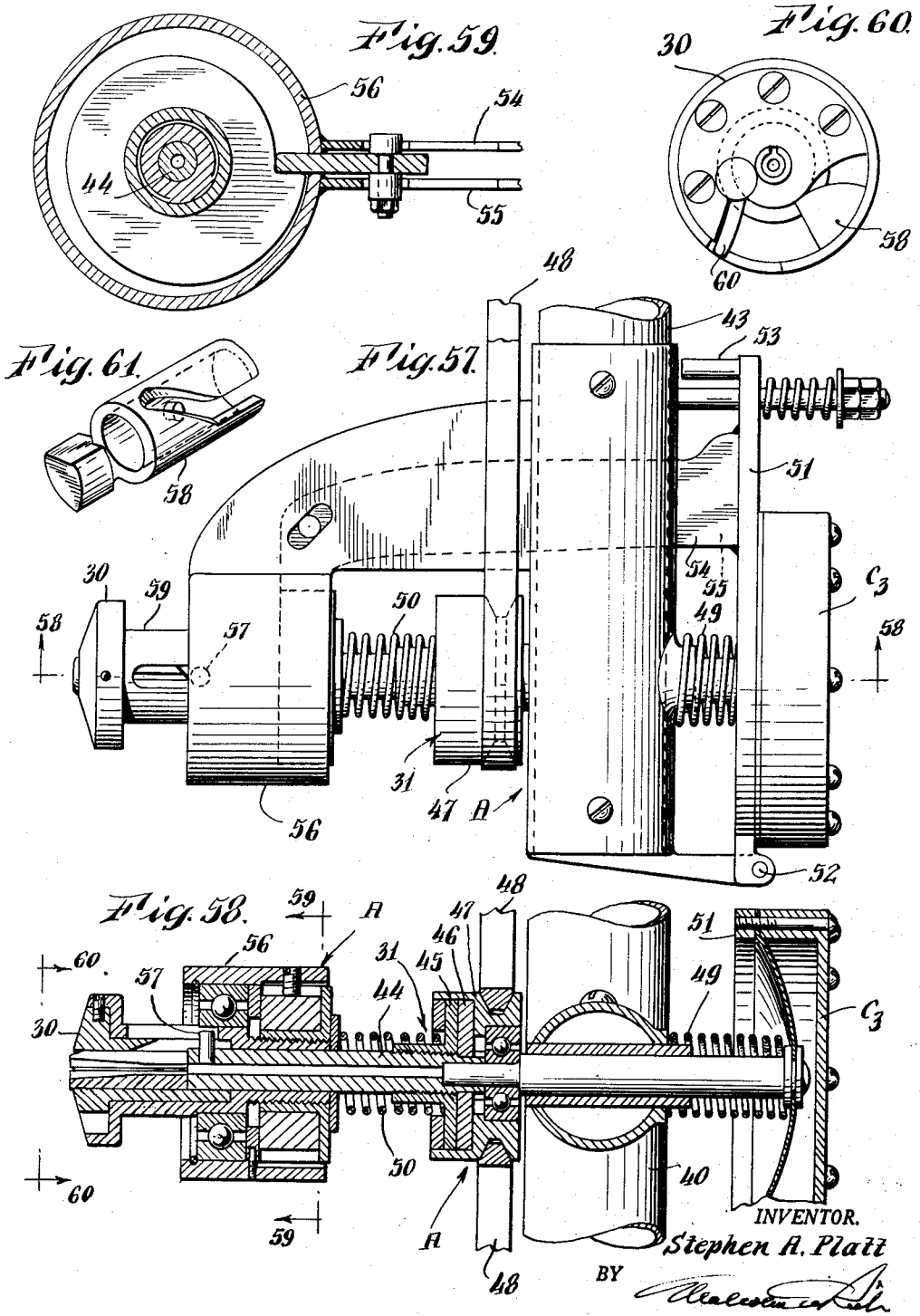

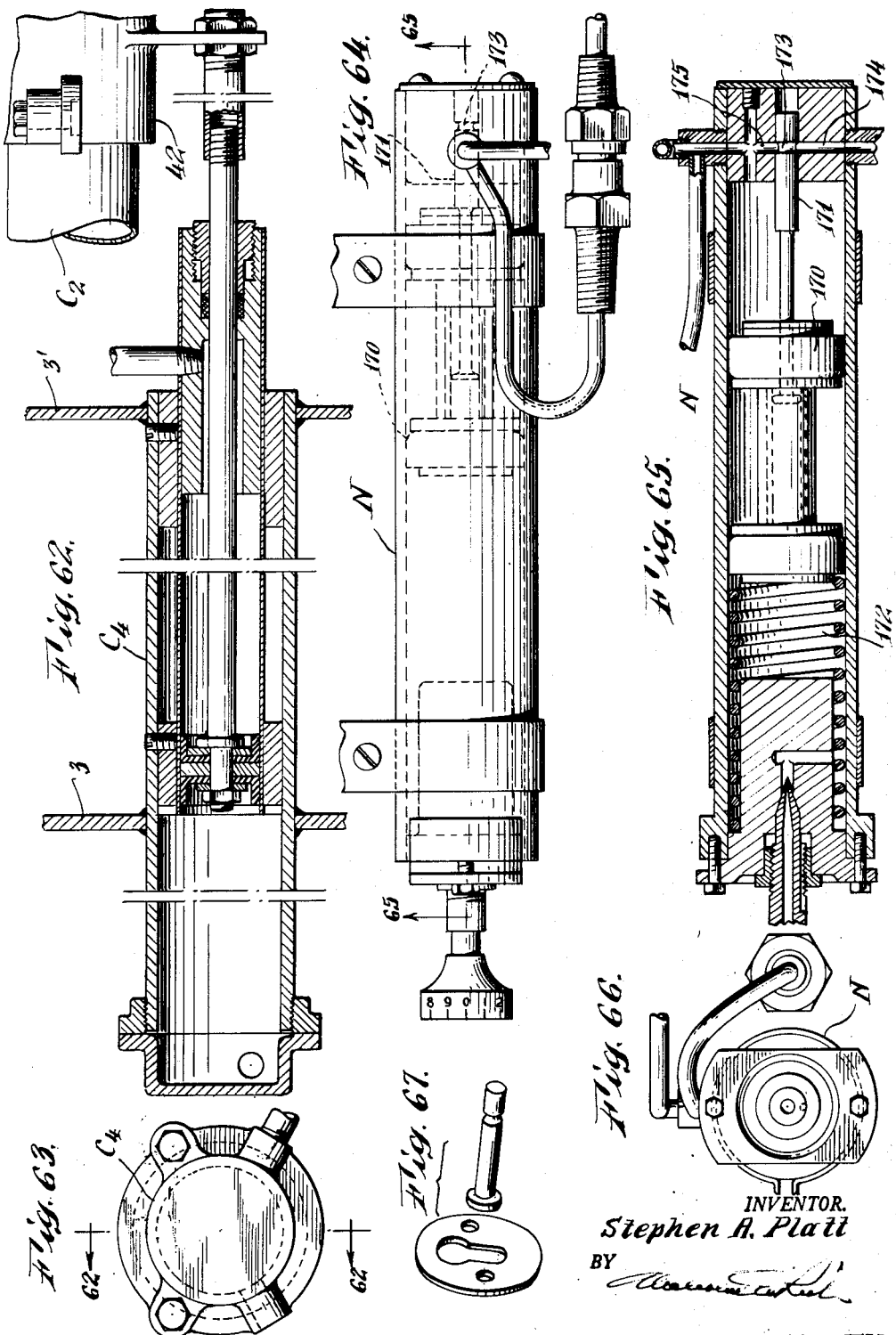

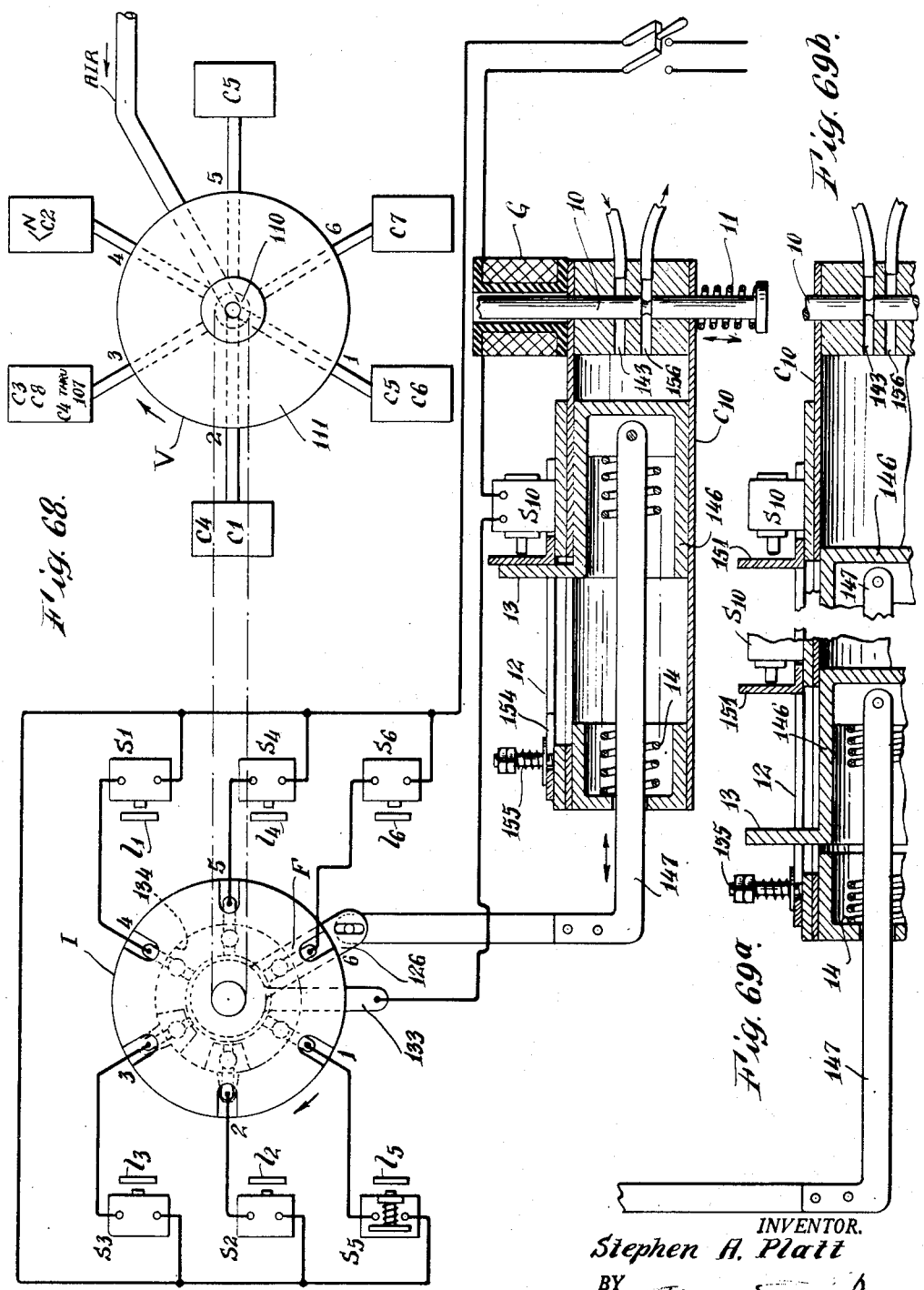

Patented Sept. 29, 1953

2,653,630

UNITED STATES PATENT OFFICE 2,653,630

APPARATUS FOR FORMING WIRE COILS

Stephen A. Platt, Wheaton, Ill., assignor to Wilbur B. Driver Company, Newark, N. J., a corporation of New Jersey Application February 28, 1950, Serial No. 146,864

9 Claims. (Cl. 140—71)

This invention relates to wire coiling devices and has for its object the provision of a wire coiling device which is adapted to form wire coils having lead wires of determined length on each coil end.

Another object is to provide a fully automatic wire coiling device of this type.

Still another object is to provide a pneumatic actuated wire coiling device and an electro-mechanical control means therefor.

A further object is to provide a wire coiling machine in which all of the mechanical movements therein are actuated by pneumatic ram means, a master air valve for selectively actuating the said ram means, and an electro-mechanical control means for selectively actuating the said air valve in a repeated sequence of operating positions for continuous operation of the device.

Other objects will be apparent as the invention is more fully hereinafter disclosed.

In accordance with these objects I have devised a fully automatic and continuously operative wire coiling device in which all of the mechanical movements involved in the feeding, coiling, lead-length forming and wire cut-off operations are actuated by an air ram means and in which the actuation of the said air ram means in the proper order and sequence is under the control of a master air valve and wherein the actuation of said master air valve is under the control of an electro-mechanical control means including an indexing means for the air valve and an indexing means for the electrical system and a solenoid-actuated pneumatic ram means for actuating the two said indexing means, all as will be more fully hereinafter described in connection with the specific embodiment of the invention illustrated in the accompanying drawings to which reference now should be made.

In the drawings, I have illustrated as one specific embodiment of the invention, but not as a limitation of the same, the device as it has been constructed and adapted for the forming of electrical resistance coils of the type employed in the forming of heating elements for electrical heater devices from wire comprised of an electrical resistance alloy consisting of nickel and chromium and containing about 80% nickel and 20% chromium. In the forming of such electrical resistance coils it is highly desirable that at each end of the coil an extended length of the wire should remain to function as lead wires to the coil from terminals to which they are attached. The forming of such lead lengths on the ends of the coil present a mechanical problem which prior art coil winding devices have failed to solve satisfactorily.

In accordance with the device of the present invention this mechanical problem is satisfactorily solved by the provision of a lead-length feeding means operating to feed a determined lead length of the wire past the coiling position before and after the coiling operation.

Referring now to the drawings—

Fig. 1 is a front elevation of the device of the specific embodiment of the present invention;

Fig. 2 is an enlarged view of front control panel of the same;

Fig. 3 is a perspective view of one operating element of the apparatus;

Fig. 4 is a back view of the same;

Fig. 5 is a perspective view of the wire coil product of the apparatus;

Fig. 6 is an enlarged top view of one end of the apparatus;

Fig. 7 is an enlarged cross-sectioned view taken along plane 7—7 of Fig. 6;

Fig. 8 is an end view of same taken along plane 8—8 of Fig. 7;

Fig. 9 is an enlarged top view of the other end of the apparatus, with Figs. 6 and 9 joined together to provide an enlarged top view of the entire apparatus;

Fig. 10 is an enlarged cross-section taken along plane 10—10 of Fig. 9 and also along plane 10—10 of Fig. 13, with front view of coiling chuck in coiling start position therewith illustrating the mandrel feed means of the present invention;

Fig. 11 is an enlarged perspective of the coiling die which is one of the improvement features of the apparatus;

Fig. 12 is a top view of the mandrel feed means shown in section in Fig. 10;

Fig. 13 is a front elevation of same;

Fig. 14 is a sectional view taken along plane 14—14 of Fig. 13;

Fig. 15 is a sectional view of the mandrel feed means taken along plane 15—15 of Fig. 13;

Fig. 16 is a view along plane 16—16 of Fig. 1;

Fig. 17 is a view along plane 17—17 of Fig. 1;

Fig. 18 is a partial back view of the apparatus;

Fig. 19 is a sectional view of the same taken along plane 19—19 of Fig. 18;

Fig. 20 is an enlarged section along plane 20—20 of Fig. 18;

Fig. 21 is a section along plane 21—21 of Fig. 18;

Fig. 22 is a sectional view along plane 22—22 of Fig. 18;

Fig. 23 is a perspective view illustrating one of the control elements shown in Fig. 64;

Figs. 24, 27 and 29 are cross-sectional views of one of the operating elements of the apparatus, the view of Fig. 29 lying intermediate the views of Figs. 24 and 27;

Fig. 25 is a section taken along plane 25—25 of Fig. 24;

Fig. 26 is a section taken along plane 26—26 of Fig. 24;

Fig. 28 is a section taken along plane 28—28 of Fig. 27;

Fig. 30 is a sectional view taken along plane 30—30 of Fig. 31;

Fig. 31 is an outside view of the same;

Fig. 32 is a view taken along plane 32—32 of Fig. 31;

Fig. 33 is an enlarged fragmentary view partly in section of part of Fig. 32;

Fig. 34 is a sectional view taken along plane 34—34 of Fig. 1;

Fig. 35 is a view taken along plane 35—35 of Fig. 34;

Fig. 36 is a section along plane 36—36 of Fig. 34;

Fig. 37 is a section along plane 37—37 of Fig. 34;

Fig. 38 is an enlarged sectional view along plane 38—38 of Fig. 40;

Fig. 39 is another view of the same showing the elements in outside view;

Fig. 40 is a section along plane 40—40 of Fig. 38 with Figs. 40 and 38 at 90° to each other;

Fig. 41 is an enlarged section along plane 41—41 of Fig. 24;

Fig. 42 is a top view of the pneumatic control means of the present invention;

Fig. 43 is a front view partly in section along plane 43—43 of Fig. 42;

Fig. 44 is a perspective view illustrating one of the elements of the control means of Fig. 42;

Fig. 45 is an end view of Fig. 42;

Fig. 46 is a back view of Fig. 42;

Fig. 47 is a section along plane 47—47 of Fig. 43;

Fig. 48 is an exploded perspective view of the parts shown in Fig. 47;

Fig. 49 is a side elevation showing the air exhaust passages of the air valve shown in Fig. 54;

Fig. 50 is a sectional view of same along plane 50—50 of Fig. 49;

Fig. 51 is a side elevation showing the air inlet passages of the air valve shown in Fig. 54;

Fig. 52 is a section along plane 52—52 of Fig. 51;

Fig. 53 is an end view of Fig. 54;

Fig. 54 is a side elevation of the master air valve shown in perspective in Fig. 48, and is a composite of the valves shown in Figs. 49 and 51;

Fig. 55 is a section along plane 55—55 of Fig. 54;

Fig. 56 is a section along plane 56—56 of Fig. 54;

Fig. 57 is a top view of the coiling chuck assembly;

Fig. 58 is a sectional view along plane 58—58 of Fig. 57;

Fig. 59 is a section along plane 59—59 of Fig. 58;

Fig. 60 is a view along plane 60—60 of Fig. 58;

Fig. 61 is an exploded perspective view of an essential part of the mechanism of Figs. 57 and 58 and partially shown in Fig. 60;

Fig. 62 is a sectional view along plane 62—62 of Fig. 63, of the auxiliary chuck carriage assembly moving means;

Fig. 63 is an end view of the same;

Fig. 64 is a side elevation of a control mechanism used in combination with the means of Figs. 62 and 63;

Fig. 65 is a section of same along plane 65—65 of Fig. 64;

Fig. 66 is an end view of Fig. 65;

Fig. 67 is an exploded perspective of one of the elements of Fig. 65;

Fig. 68 is a schematic diagram illustrating the co-operative functioning of the electro-mechanical means controlling the distribution of air to the pneumatic means of the present invention and of energizing electric current to the control means;

Fig. 69a is a fragmentary view of the left side of the mechanism shown in Fig. 68 disclosing the second position of one of the operating elements thereof.

Fig. 69b is a fragmentary view of the right side of the mechanism shown in Fig. 68 disclosing the second position of one of the operating elements thereof.

As may be noted from a study of the device illustrated in the drawings the device consists of a plurality of mechanical movements, each pneumo-actuated in which the several operations involved in the feeding, forming and severing of a coil $c$ (Fig. 5) having determined lead lengths $a$ and $b$ on each end thereof, are repeatedly performed for continuous operation of the device, such continuous operation of the pneumo-actuated means being achieved through the operation of a master air valve V into a plurality of air distributing positions and an electro-mechanical means for controlling the actuation of the air valve into the plurality of air distributing positions.

Referring to the drawings, the plurality of mechanical elements comprising the present invention consist of a mandrel M sustained horizontally to be movable axially from a rest position to first coil winding position and to be rotatable about its axis and to be movable axially from final coil winding position back to first or rest position; a chuck assembly A mounted to be movable horizontally with the chuck axis in alignment with the mandrel axis from final coil winding position to mandrel engaging position with means to engage the chuck with the mandrel and to rotate the chuck and mandrel; a pneumo-mechanical means for converting the rotating movement of the mandrel by the chuck into a mandrel advancing chuck carriage return movement and a pneumatic ram means assisting the same, a wire feeding means W feeding the wire $w$ to the mandrel M at the mandrel-chuck engaging position; a lead-length feeding means L; a wire cut-off means B; a motor means D, a drive shaft E, and a power take-off means P for driving the chuck; a master distributor air valve V, a plurality of pneumatic ram means $C_1$ to $C_8$, for actuating each of the mechanical elements of the device, each being actuated by air from the air valve V; a ratchet means F for operating the air valve V into successive operating positions of air distribution; a solenoid actuated ram means $C_{10}$ for operating the said ratchet means F, an electrical control means consisting of a plurality of electrical circuits each including the solenoid G of the ram means $C_{10}$, switch $S_{10}$ and one of the switches $S_1$ to $S_6$; and an indexing means I actuated by the ratchet means F for making and breaking the said plurality of electrical circuits in a determined order to provide for the continuous operation of the device.

Each of these mechanical elements with its associated pneumatic and electrical actuating means have been illustrated in the drawings in detail and in combination, it being understood that each element is adapted to wide modification, per se, without essential departure from the invention and that the specific embodiment of the drawings is by way of example and not by way of limitation.

Referring first to Fig. 68, the schematic diagram of this figure is designed to illustrate the cooperative functioning of the various parts and elements of the invention. In this figure the valve V is shown as being arranged to receive air under a determined pressure from a source and to distribute the air in each position of rotation to a specified ram means selected from the rams $C_1$ to $C_8$. The rotating member of this valve V is shown by dotted line connection to be operatively connected to ratchet means F which is shown as connected to a ram means $C_{10}$ for operation by the ram. The actuation of the ram $C_{10}$ is shown as being under the control of solenoid G. The energization of the solenoid G is shown as being under the control of an electric circuit including switch $S_{10}$ and indexing means I directing the electric current successively to switches $S_1$ to $S_6$ which on being closed by the respective means $I_1$ to $I_6$ completes the energizing circuit for the solenoid G actuating the same to move the valve stem 10 from the position shown to open position against the action of spring means 11 thereby admitting air to the ram means $C_{10}$ actuating the same to move the ratchet F through one indexing position with corresponding movement of the rotating valve element 110 of valve V and of the circuit indexing means I. The ram $C_{10}$ at the conclusion of its stroke operates a trip mechanism including slide plate 12 and pin 13 which opens switch $S_{10}$ to break the solenoid energizing circuit as the indexing movement of means F and I is completed and upon the return of the ram $C_{10}$ to first position by the action of compression spring 14 switch $S_{10}$ is closed to prepare the circuit in the indexed position of means H for the energization of solenoid G upon the closing of its switch $S_1$ to $S_6$ by its means $I_1$ to $I_6$. In this manner the cycle of operations controlled by the pneumatic rams $C_1$ to $C_6$ is repeated indefinitely thereby achieving continuous operation of the coiling device.

The several mechanical elements with the pneumatic ram means associated therewith for actuating the same will now be described in detail.

Referring first to Figs. 1, 6, 7, the details of the means for supporting, moving and rotating the mandrel M will be noted. The mandrel M is sustained horizontally in slotted tube 20 (Fig. 7) with the rear end of the mandrel engaged by guide plate 21 passing through the tube slot in a connection providing for substantially free rotation of the mandrel M about its axis. A single action pneumatic ram means $C_1$ is operatively connected by yoke 22 to the guide plate 21 for movement of the mandrel M endwise from a rest position to the chuck-engaging first coil winding position. A second single action pneumatic ram means $C_2$ is provided (Fig. 1) which is connected to the rear end of plate 21 by pullwire 23 passing over pulleys 24 and 25 to retract the mandrel M from final coil winding position to the rest position indicated in Fig. 1. As indicated in Fig. 6 as the mandrel M is retracted by the ram $C_2$ to rest position, the guide plate 21 engages lever $I_1$ which is disposed in a position to engage switch $S_1$.

Referring now to Figs. 1, 9, 10, 57 to 61, inclusive, the details of chuck assembly A may be noted. This chuck assembly consists of a chuck 30, a clutch means 31 for engaging the chuck 30 to the drive shaft E through belt drive connection 32 to the power take-off means P, a pneumatic ram means $C_3$ for actuating the clutch and chuck, a means for sustaining the chuck assembly A to be movable to and away from the point of mandrel engagement with the chuck 30 in alignment with the mandrel axis and a pneumatic ram means $C_4$ for moving the chuck assembly to mandrel engaging position, a mechanical pneumatic means that will hereinafter be more fully described for returning the chuck assembly A to first position at a determined rate during the wire coiling operation, and a means such as lever $I_3$ to actuate switch $S_3$ (Fig. 19) when the chuck assembly A has been returned to its final coil winding position. A spring stop means O is provided to cushion the assembly A as it arrives in mandrel engaging position.

As indicated in the drawings (Fig. 1) the chuck assembly A is mounted for sliding movement upon the tubular housings for pneumatic rams $C_2$ and $C_5$ by means of a tubular support member 40 having its opposite ends secured to slide members 41 and 42 engaging the outer surface of rams $C_2$ and $C_5$, respectively, the chuck assembly A being detachably mounted on extension 43 of the member 40 in a sliding connection permitting adjustment and positioning of the assembly A for aligning the chuck axis with the mandrel axis.

The details of the chuck assembly may be noted in Figs. 57 to 60, inclusive, wherein it may be seen that the chuck 30 is mounted on the end of a rotatable spindle 44, one end of which is attached to stationary clutch plate 45, the rotating plate 46 of said clutch being rotated by pulley 47 rotated by belt 48 of the power take-off means P. Engagement and disengagement of the clutch means is obtained through the actuation of pneumatic ram means $C_3$, as is also obtained the engagement and disengagement of the clutch 30 with the mandrel M and the wire $w$ at the mandrel engaging first coil winding position of the mandrel and clutch assembly. As may be noted from the drawings Figs. 57 and 58, actuation of the ram $C_3$ against the action of springs 49 and 50 lever 51 is actuated about its pivot 52 a distance limited by pin 53 thereby moving parallel plates 54—55 forwardly a distance pushing housing 56 forwardly a distance engaging pin 57 on rotating spindle 44 in the locking element 58 and the shank 59 of the chuck 30, thereby actuating the locking member 58 and imparting rotating movement to the chuck 30 with mandrel gripping pressure.

Locking member 58 is provided in the chuck 30 to coact with lever 60 to secure the wire $w$ for coiling on the mandrel M as the mandrel is rotated with reverse movement of the chuck assembly and mandrel towards the first position of the chuck assembly at a determined rate imparting a desired coil pitch to the coil turns. The mechanical-pneumatic means for obtaining a return of the chuck carriage to first position at this determined rate will be more fully hereinafter described.

Referring now to Figs. 1, 3, 4 and 16, the details of the wire feeding means W may be noted. In this means, a spool of wire 61 is mounted on the end of an overhanging spindle 62 which is sustained in position by bracket 63 extending upwardly from the side 3 of the frame including base supports 1—1 and split uprights 2—2' and side plates 3—3 with front panel 4. The spool 61 is restrained from free rotation on the spindle 62 by brake means 64 having a spring arm 65 moving in opposition to spring return means 66 in the end of which is a pulley 66' over which the wire $w$ passes on its way to the lead feed means L. This wire feeding means is old, per se, and forms no part of the present invention except in combination with the remaining elements and means employed.

Referring now to the lead-feed mechanism L and to the means provided to actuate the same, this mechanism and means is designed to obtain a feeding of a determined length of the wire $w$ past the mandrel M at the point of chuck engagement in first coil winding position to provide the desired lead lengths $a$ and $b$ at each end of the coil $c$. It accordingly must receive the wire $w$ from the wire feeding means W, engage the same for forward feeding before and after coil winding and release or leave the wire $w$ free for feeding during the coil winding operation.

This result is obtained by the means provided, the details of which may be noted from Figs. 1, 9, 17, 24 to 29, inclusive, and 30 to 33, inclusive. As indicated in the drawings the wire $w$ passes from the pulley 66' to the means L wherein it first passes around a capstan 70 and then through tube 71 to the coiling die 72 (Fig. 11), the details of which will hereinafter be described, to the mandrel M at the point of chuck engagement.

Capstan 70 is mounted in a standard type of overriding clutch assembly on the end of shaft 72' which is rotatable by the gear and rack drive means 73 and 74. The capstan 70 is restrained from rotating in a direction opposite to the direction of wire feed but may be rotated forwardly by the pull on the wire $w$ during coil winding independently of rotation of shaft 72' or by direct forward drive through shaft 72'. This type of mechanical movement, per se, is old and well known in the art and forms no part of the invention except in combination with the other elements thereof.

In the surface of capstan 70 I have provided a groove 75 in which the wire $w$ is received and an idler roller 76 with an annular extension 77 fitting the groove 75 is mounted in a position in front of the capstan 70 for spring engagement of the extension 77 in the groove 75 by means of spring 78 to hold the wire $w$ in position on the capstan 70.

Forward actuation of the capstan 70 by means of the rotation of shaft 72' by actuation of rack 74 is obtained by means of pneumatic ram means $C_5$. This actuation is in two stages, the first stage occurring after the mandrel M has been moved into chuck engaging position and resulting in the forming of the lead length on the front end of the coil $c$, and the second stage occurring after the coil $c$ has been wound on the mandrel M and after the mandrel has been withdrawn from the coil. Accordingly, actuation of ram means $C_5$ is obtained in two stages and reference now should be made to Figs. 24 to 29, inclusive. In these figures Fig. 29 should be considered as intermediate Figs. 24 and 27 between the planes A—A and A'—A'.

As indicated in these figures, the ram $C_5$ is a single acting ram, the piston 80 therein operating against the action of spring return 81. Rack 74 is attached directly to the piston 80 and on the end of the rack 74 there is provided a plunger 82 which precedes the rack 74 along split tube 83.

Along tube 83 and in the path of travel of plunger 82 are provided two spaced stop means $J_1$ and $J_2$, mounted in association with switches $S_4$ and $S_5$ to be adjustable along the length of the split tube 83. Stop means $J_1$ is arranged to be released from stop position by the actuation of pneumatic ram means $C_6$ permitting the ram $C_5$ to finish its stroke as it may be limited by the position of the mechanical stop means $J_2$. As indicated in the drawings upon the engagement of the plunger end 82 with the stop means $J_1$ switch $S_4$ is closed by contact of arm $l_4$ therewith and upon the engagement of the plunger end 82 with the mechanical stop means $J_2$ switch $S_5$ is closed by the contact of arm $l_5$ therewith. The closing of both switches is obtained by means of the limited movement of the stop means $J_1$ and $J_2$ in their mountings, substantially as indicated in the drawings.

The pneumatic means for releasing the stop means $J_1$ from stop position is indicated in Fig. 41 wherein it may be noted that the stop extension 90 is dependingly secured to a ring 91 and is held normally in stop position by spring means 92 the ends of which springs are secured to the pneumatic ram means $C_6$ which upon operation pushes against the ring 91 lifting the stop extension 90 out of stop position, the spring 92 operating to return the stop extension to stop position when the ram $C_6$ is released.

The wire cut-off means B, as indicated in Figs. 34–37, consists of a stationary blade 95 and a movable blade 96 and a pneumatic ram means $C_7$ for actuating the movable blade 96. This means B is mounted on side plate 3' of the device in a position along the line of wire feed from the lead feed means L to the coiling die 72 intercepting the wire $w$ just after leaving the delivery tube 71 and before entering the die 72 so that the wire may be cut without deflecting the wire from its prescribed path of travel into the coiling die 72.

As indicated in Fig. 34, the ram $C_7$ is provided with a lever extension $l_6$ thereon which on movement by the ram contacts and closes switch $S_6$ at the conclusion of the ram movement.

The pneumo-mechanical means H for translating the rotating motion of the mandrel M induced by the chuck assembly A into a forward thrust movement on the mandrel and chuck assembly thereby to move the chuck assembly during the coiling operation to first position, is illustrated in Figs. 10 and 12 to 15 inclusive. This means comprises essentially a pair of rollers R—R' independently mounted on opposite sides of the mandrel M in the housing H with the roller axis parallel to the mandrel axis but adjustable at an angle thereto and a pneumatic actuated means to bring the rollers R—R' into frictional contact with the rotating mandrel surface, the angle at which the rollers are inclined to the mandrel surface governing the rate of forward feed of the mandrel incident to the conversion of the rotating motion of the mandrel to forward thrust motion by the said rollers.

While various modified forms of this mechanical movement are available in the art, the specific embodiment shown appears the simplest. In this embodiment the mandrel M as it is fed into chuck engaging position passes into the housing H and through spaced aligned guide bushings 101—102 held in spaced aligned position by yoke 100. The rollers R—R' are mounted on opposite sides of the mandrel in the space gap between the guide bushings and operatively connected to the worm and gear mechanism 105 manually operable by knob 106 to be moved such as to angularly dispose the roller surfaces to the mandrel surface in the direction imparting forward motion to the mandrel upon rotation of the mandrel by the chuck. Each roller R—R' is separately sustained in a piston 103—103' of a pneumatic ram means enclosed by the housing H, the said pistons being each urged towards the mandrel M upon the application of air through port opening 104 to bring the roller surfaces into determined frictional contact with the rotating mandrel surface. The ram means here involved will hereinafter be referred to as ram means $C_8$.

To overcome slippage between the rollers R—R' and mandrel M with resultant irregular forward thrust movement, the pneumatic ram means $C_4$ also is actuated simultaneously to apply a controlled amount of air pressure, regulated by valve 107 (Fig. 16), to insure steady forward thrust movement of the mandrel and steady return movement of the chuck carriage assembly A to first position. This movement of the chuck carriage assembly A during the coil winding operation continues until lever $l_3$ on the chuck carriage assembly contacts switch $S_3$ which is adjustable along the exterior surface of the ram $C_2$ for prescribing the length of the coil.

The sequential operation of the plurality of pneumatic ram actuating means hereinabove described is under the control of the master air valve V (Figs. 42 to 56) the operation of which valve V is under the control of valve indexing ram $C_{10}$ the actuation of which ram is under the control of an electric control circuit including a solenoid G of a solenoid actuated valve and a plurality of micro-switches ($S_1$ to $S_6$) positioned to be actuated by the plurality of ram means, all as will now be described.

The master air valve V, the details of which are shown in Figs. 42 to 56, is essentially a rotatable slide valve, wherein air from a source of supply may be directed in each position of 60° rotation about an angle of 360° successively to a plurality of air channels directing the air to the plurality of pneumatic ram means hereinabove described and also to hold or to release air from these said air channels at predetermined desired positions of rotation.

Operation of this air valve V to its successive positions of rotation is obtained by means of an indexing means through a ratchet connection to the rotating element of the valve V, said indexing means also indexing the control circuits, said indexing means being actuated periodically by a pneumatic ram $C_{10}$ energization of which ram is under the control of solenoid G the energization of which in turn is controlled by the plurality of micro-switches $S_1$ to $S_6$, inclusive.

The rotatable slide valve V consists of a rotatable member 110 (see Fig. 48) and a stationary member 111. Member 110 rotates within member 111, the outer cylindrical face of 110 engaging the inner cylindrical surface of the member 111 in a lubricated ground and lap joint providing an air seal therebetween.

Member 110 is comprised of a steel rod having a pair of axially aligned air pasageways 112 and 113 extending inwardly from the end of the rod a determined distance approximating the length of member 111. Passageway 112 is the air exhaust passageway and 113 is the air inlet passageway. The cylindrical surface of member 110 is provided with a plurality of transverse grooves 114 and holes 115 with each groove provided with a hole 116. Some of these holes 115 and 116 communicate with passageway 112 and some with passageway 113 thus forming a plurality of intake and exhaust port openings in the member 110. After machining to the size, shape and configuration indicated in the drawings the member 110 is hardened and ground and lapped to fit the center opening 117 in member 111.

Member 111 is a heavy walled cylindrical body comprised of a bearing bronze alloy formed from a rod of suitable diameter through which axially located bore passageway 117 is drilled, reamed and lapped together with member 110 to perfect fit. A plurality of channels 118 are drilled through the heavy cylindrical wall of member 111 communicating with the axial bore 117, said openings 118 being spaced in spiral alignment in the wall of member 111 the spacing therebetween corresponding to the spacing between the grooves and holes 114 and 115 provided in member 110, so that on rotation of member 110 within the axial bore 117 the grooves 114 and holes 115 in member 110 will be sequentially aligned with channels 118 in one complete revolution of member 110, thereby either feeding air through or exhausting air out of the aligned channel 118.

The exit opening of each channel 118 is counter-bored and threaded to accommodate a threaded fitting 119 to which an air conduit may be connected for the delivery of air to or from a pneumatic means to be connected therewith, such as any one of the pneumatic ram means hereinabove described, the particular order of connection to said ram means depending upon the sequence of operation of said ram means that is desired. This sequence will hereinafter be described more fully.

The closed end of member 110 is shaped to a six-step indexing ratchet section 120 and an electrical contact carrying section 121 having a flat spot 122 locating the position of the sliding contact 123 to be mounted thereon.

Referring now to the assembled cross-sectional view of Fig. 47 and to the exploded view of Fig. 48, it will be seen that an annular ratchet actuating member 124 having spring-loaded teeth 125—125 is disposed in operating position over ratchet section 120 within a fitted recess 128 provided in the end of member 111 and is secured for oscillating motion to crank-arm 126 by rivets passing through openings 127 in ratchet acting member 124 and crank-arm 126, with a horseshoe-type spacer member 129 interposed therebetween and abutting against the outer face of the end of member 111 with the opening of the horseshoe aligned with the crank-arm 126 to limit the oscillating movement of the crank-arm.

Crank-arm 126 is oscillated periodically by the pneumatic ram means $C_{10}$ by link connection 147 (see also Fig. 43) as will be hereinafter described, each oscillation of the crank-arm 126 resulting in a rotation of the member 110 about its axis through a determined arc of rotation depending upon the total number of operating positions desired. In the present embodiment six (6) operating positions are employed and each oscillation of crank-arm 126 by ram C10 is calculated to provide an angle of rotation of 60° to member 100.

In each position of rotation of member 110 it is also desired to close an open electric circuit which upon later being energized by the closing of one of the micro-switches S1 to S6 will energize the solenoid G to again actuate the ram C10 to move the member 110 through another 60° angle of rotation, at the conclusion of which movement the energized circuit is broken and another open electric circuit is closed and made ready for energization upon the closing of the next micro-switch S1 to S6.

This result is obtained by the distributor means 131 which comprises an insulating ring provided with a center contact ring 132 electrically connected by connector arm 133 to a source of electric current through a control micro-switch S10 (Fig. 43 and also Fig. 68) which ring 131 is fixedly secured in insulated position against rotative movement substantially as indicated in Fig. 47, in spaced abutting relation to horseshoe ring 129.

Upon the extending end of member 111 is disposed contact carrying disc 134 carrying contact 123 and keyed to the contact carrying section 121 of member 110 by a set-screw engaging the flat spot 122 thereon, the position of the flat spot 122 being selected to locate contact 123 in a position one step ahead of the pneumatic circuits being successively closed on rotation of the member 110. Means, such as knob 140, is provided for manual actuation of member 110 to any desired position of rotation when desired.

Solenoid G (Fig. 43) is arranged, upon energization by the closing of any one of the control switches S1 to S6, to operate a slide valve pin 10 from the rest or open position shown in Fig. 43 to a closed or operating position against the action of spring return means 11, in the direction of the arrow, to a position bringing the passageway 142 therein in alignment with air intake passageway 143 delivering air under pressure from feed opening 144 into chamber 145 against piston 146, actuating same in the direction of the arrow against the action of compression spring 14 thereby moving piston arm 147 sufficiently to move crank-arm 126 through one indexing position with resultant movement of member 110 and contact carrying disc 134. The indexing movement of member 110 directs the air flow in valve V to the next air ram actuated mechanism and the idexing movement of disc 134 closes the electrical circuit including the switch S1 to S6 to be closed at the conclusion of the movement of the air ram actuated mechanism actuated by said indexing movement.

During the operation of the air ram C10 it is important to keep the solenoid G energized until the indexing movement is completed and to provide means to break the energizing electric circuit at the conclusion of the piston movement and the instant before disc 134 completes its indexing movement into the next indexing position. This is accomplished by means of the delayed action trip mechanism shown in Figs. 42 to 44, inclusive. This mechanism includes a slide plate 12 having an arm 151 normally disposed in contact closing position against switch S10 and a channel 152, the said slide plate being disposed in a position over the ram C10 to permit pin 13 to engage in the channel 152, said pin 13 being secured to the piston 146 on the ram C10 to be moved thereby. Upon movement of piston 146 and pin 13 in the direction of the arrow, the slide plate 12 remains in contact closing position until the pin 13 reaches the end of the channel 152, whereupon the slide plate 12 is moved in the direction of pin movement sufficiently to open switch S10, such movement being obtained by means of auxiliary channel 154 engaged by stationary spring press pin 155. As may be noted, upon the deenergization of solenoid G when switch S10 is opened, spring means 11 returns slide valve 10 to first position aligning passageway 142 with air exhaust passageway 156 releasing the pressure on piston 146 permitting compression spring 14 to return the piston 146 to first position, pin 13 returning therewith and engaging the opposite end of channel 152 in the slide plate 12 to return the slide plate to first position with the arm 151 thereon in contact closing position against switch S10, thus closing the solenoid actuating circuit except for the open switch S1 to S6 awaiting closing by the pneumatic means actuated in the indexed position of member 110.

As hereinabove indicated there are, in the present device six (6) indexing positions of member 110 in the valve means V and a corresponding number of electrical circuits each with a switch S1 to S6 with switch S10 controlling the time period of actuating solenoid G. The schematic diagram of Fig. 68 indicates these six (6) indexing positions of contact carrying disc 134 and of member 110 of valve V, respectively, it being understood that contact carrying disc 134 is always one position ahead of member 110 so that solenoid G may be actuated at the conclusion of the mechanical movement initiated pneumatically by the member 110 in its indexed position, to index the member 110 to its next position upon the closing of the switch S1 to S6 included in the circuit closed by the contact carrying disc 134 in that indexed position.

Arbitrarily, I have given the number 1 to that operating position of the valve V wherein the lead feed mechanism is actuated to form the lead length at the front end of the coil and the number 6 to that operating position wherein the rear lead length of the formed coil is formed and cut off.

In this operating position of member 110, which on the dial D is identified by the segment colored blue and marked with numeral one (1), the air under pressure from the source (not shown) passes through valve V to ram C5 and is fed to the ram C6 of the stop means J1 releasing the stop means Figs. 1, 25 and 26 and permitting the ram C5 to move rack 74 with resultant rotation of capstan 70 of the lead feed means L to forwardly feed a length of wire w, said length being limited by the distance of ram movement prescribed by the position of mechanical stop means J2 with resultant closing of switch S5.

The closing of switch S5 re-energizes solenoid G with resultant operation of the indexing means by ram C10 and movement of member 110 and disc 134 to the next indexing position, noted as yellow segment on the dial indicated on the panel 4. In this position valve V directs the air to the chuck carriage return ram C4 and also to the mandrel positioning ram C1, moving the chuck carriage to the left and the mandrel to the right into coil winding start position. As the chuck carriage A reaches its prescribed position for mandrel engagement, switch S2 (Fig. 18) is closed by means of lever arm l2, again energizing solenoid G to actuate ram C10 to move the member 110 and the disc 134 into next indexing position, marked in red segment and by numeral 3 on the front panel dial, in which position the valve V directs the air to the coiling chuck assembly (C3), the coiling pitch rolls rams C8, the chuck carriage return cylinder C4 through valve 107 causing the chuck A to engage the mandrel M and the wire $w$ and the clutch mechanism to operate to engage the chuck for rotation by the drive shaft E, through the drive connection P and the coiling pitch rolls R—R' to engage the mandrel by actuation of the ram C8 for forward feeding of the mandrel M along with the chuck carriage assembly with the assistance of the chuck carriage return ram C4. The coiling operation is thus initiated and continues until the chuck carriage assembly is moved a distance limited by the position of switch S3 Fig. 19. The closing of switch S3 by lever l3 reenergizes solenoid G to actuate the indexing mechanism into its fourth position of rotation, indicated by green segment and numeral 4 on the front panel dial.

In this fourth position of rotation, member 110 releases the air from the chuck carriage assembly thereby releasing the clutch connection to the shaft E Fig. 1 and the chuck from mandrel gripping position, permitting the coil C to unwind or "spin back" sufficiently to permit the mandrel M to be withdrawn therefrom.

To obtain this time delay to permit the coil C to unwind from the mandrel M before energization of the mandrel pull-back cylinder C2, a bias cylinder N is provided (see Fig. 64), which in effect intercepts the air passage to the pull-back ram C2 for a time interval required for the ram 170 therein to move the slide valve 171 in opposition to compression spring 172 into a position aligning passageway 173 therein with passageways 174 and 175, thereby directing the air through these passageways into the mandrel pull-back ram C2.

As the mandrel is pulled back to first operating position by the ram means C2, switch S1 is is closed by means of arm l1 (Fig. 6) which again actuates solenoid G to move member 110 into its next indexing position, indicated by numeral 5 in white segment on the front panel dial. In this indexing position the valve V directs the air to the lead feed ram C5 which actuates the rack 74 and lead feed mechanism to form the rear lead length on the coil, the length of said lead being determined by the position of stop means J1.

As the forward end of rack 74 hits stop J1 switch S4 is closed and the solenoid G is again energized to actuate the indexing mechanism to move member 110 into its sixth and final position of rotation, marked by numeral 6 in the orange segment on the front panel dial, in which position air is directed to ram C7 of the lead wire cut-off mechanism cutting off the finished coil. At the end of the cut-off mechanism stroke switch S6 is closed by arm l6 (Fig. 34) reenergizing the solenoid G to actuate the indexing mechanism to move the member 110 to first position and the cycle of operations above described is repeated.

Referring to Figs. 11, 38, 39 and 40, the details of the coiling die 72 and its mounting may be noted. The die 72 is mounted for rotation in bearing 200 sustained in hemispherical base 201 engaging a hemispherical recess in the side wall 3' and retained in position therein by cover plate 202. The wire $w$, as it leaves tube 71 passes through the opening 203 in the cover plate 202 and between the blades 95—96 of the wire cut-off means B to the mandrel M.

As indicated in the drawings the several operating elements hereinabove described with associated elements shown but not described are sustained in desired operating relationship in a skeleton form consisting of base plates 1—1', split rear uprights 2—2', side plates 3—3' and front panel 4.

The various operating elements hereinabove described and illustrated in the drawings may each be extensively modified without essential departure from the invention and other expediencies and mechanisms may be substituted therefor to obtain substantially the same result without departure from the invention, as one skilled in the art will recognize.

From the above description of the present invention and the specific embodiment of the same illustrated in the drawings and described specifically hereinabove, it is believed apparent that the wire coiling device of the present invention may be widely modified without essential departure from the invention and all such modifications and departures therein are contemplated as may fall within the scope of the following claims.

What I claim is:

1. A wire coiling device comprising in combination, a mandrel and means sustaining the mandrel horizontally for endwise movement in both directions and for axial rotation, an air actuated means to advance the mandrel endwise to a chuck engaging-first coil winding position, an air actuated means to retract the mandrel from final coil winding position, a rotatable chuck means and means sustaining the same horizontally in axial alignment with the mandrel axis for movement towards and away from the mandrel at chuck engaging-first coil winding position, a drive means for rotating the said chuck means, an air actuated means for moving the chuck into mandrel engaging position, an air actuated means for engaging the chuck with the mandrel and the drive means for simultaneous rotation of the chuck and mandrel, and air actuated means translating the rotative movement of the mandrel into forward thrust movement in the direction of chuck return to first position, and means feeding wire to the mandrel and chuck at the chuck engaging position and means actuated upon chuck engagement with the mandrel to engage the wire for coiling about the mandrel during mandrel rotation and forward thrust movement.

2. The combination of claim 1, wherein a lead feed means is disposed in the path of travel of the wire to the mandrel for feeding a determined length of wire past the mandrel at the point of chuck engagement in first coil winding position.

3. The combination of claim 1, wherein a wire cut-off means is disposed adjacent the point of chuck engagement in first coil winding position intercepting the wire ahead of the mandrel.

4. The combination of claim 1, wherein an air distributing valve means is provided, said valve directing the air in successive indexed positions to different port exit openings and wherein each of said air actuated means is connected to said port openings to be operated in desired sequential order upon valve indexing.

5. The combination of claim 4, wherein means automatically indexing said valve is provided.

6. The combination of claim 4, wherein an air actuated means for indexing said valve into its successive indexing positions is provided, 7. The combination of claim 4, wherein an air actuated means for indexing said valve into its successive indexing positions is provided and a solenoid actuated valve means controlling the actuation of said air actuated indexing means is provided, the actuation of said solenoid actuated valve means being under the control of an electrical control means including switch means disposed in a position to be closed at the conclusion of each mechanical movement of the air actuated means energized through said air distributing valve.

8. The combination of claim 4, wherein the said air distributing valve is actuated automatically into its successive indexed positions by an indexing means and the actuation of said indexing means is under the control of an electrical control circuit having switches disposed in a position to be actuated upon the completion of the mechanical movements of each air actuated means energized by the air distributing valve.

9. A wire coiling device comprising in combination a mandrel, means sustaining the same horizontally to be movable endwise and rotatable axially, an air actuated means for moving the mandrel into a chuck engaging-first coil winding position, a rotatable chuck, a drive means for rotating the chuck, and means sustaining the chuck in axial alignment with the mandrel to be movable from a final coil winding position to first coil winding and mandrel engaging position, an air actuated means for moving the chuck into said first coil winding position, an air actuated means for engaging the chuck to the mandrel and to said drive means for rotating the chuck and mandrel, a wire feeding means feeding wire to the chuck and mandrel at the chuck and mandrel engaging position and means on said chuck actuated on chuck engagement with the mandrel to engage the wire, a lead feed means intercepting the wire passing to the chuck and mandrel for feeding a determined length of wire past the mandrel, air actuated means to operate said lead feed means, a wire cut-off means disposed in the path of travel of said wire between the lead feed means and the mandrel, air actuated means to operate the same, means translating the rotative motion of said mandrel after chuck engagement therewith into a forward thrust movement returning the chuck to first position at a determined rate, air actuated means for operating said translating means, an air distributing valve arranged to direct the air intake in successive positions into determined air outlet openings and means connecting the said air actuated means in a desired operating sequence to said air outlet openings, an indexing means for actuating said air distributing valve into said successive positions, an air actuated means for actuating said indexing means, a solenoid actuated valve means controlling the operation of said air actuated means, and a plurality of electrical circuits one for each indexed position of said air distributing valve each said circuit having a switch disposed in a position to be actuated at the conclusion of the mechanical movement of each of the means actuated by air from the said air distributing valve, the solenoid of the said solenoid actuated valve and a solenoid deenergizing switch, a second indexing means for said plurality of circuits, said second indexing means being operatively connected with the first indexing means to be operated therewith to an indexing position one position ahead of the first indexing means, and means actuated by the indexing air actuated means to actuate the solenoid deenergizing switch at the conclusion of each indexing movement and to reversely actuate the switch upon the return of said air actuated means to first position.

STEPHEN A. PLATT.

References Cited in the file of this patent

UNITED STATES PATENTS

| Number | Name | Date |
| --- | --- | --- |
| 1,288,134 | Naylor | Dec. 17, 1918 |
| 1,933,320 | Eaton | Oct. 31, 1933 |
| 2,014,833 | Burns | Sept. 17, 1935 |
| 2,152,437 | Lear | Mar. 28, 1939 |
| 2,162,498 | Beebe | June 13, 1939 |
| 2,192,260 | Fisher | Mar. 5, 1940 |
| 2,248,149 | Wilson | July 8, 1941 |
| 2,371,781 | Sirp | Mar. 20, 1945 |
| 2,374,520 | Anderson | Apr. 24, 1945 |
| 2,425,015 | Van Sant | Aug. 5, 1947 |
| 2,439,893 | Iden | Apr. 20, 1948 |